(12) United States Patent
Mansour

(10) Patent No.: US 7,924,778 B2
(45) Date of Patent: Apr. 12, 2011

(54) SYSTEM AND METHOD OF INCREASING THE DATA THROUGHPUT OF THE PDCH CHANNEL IN A WIRELESS COMMUNICATION SYSTEM

(75) Inventor: Nagi A. Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 1414 days.

(21) Appl. No.: 11/202,488

(22) Filed: Aug. 12, 2005

(65) Prior Publication Data
US 2007/0036070 A1    Feb. 15, 2007

(51) Int. Cl.
*H04W 4/00* (2009.01)
(52) U.S. Cl. ........ 370/329; 370/209; 370/352; 455/518; 455/444; 375/267; 375/260; 375/148
(58) Field of Classification Search .................. 370/351, 370/352, 401, 465, 353, 354, 355, 356; 375/267, 375/260, 148; 455/518, 444
See application file for complete search history.

(56) References Cited

U.S. PATENT DOCUMENTS

| | | | | |
|---|---|---|---|---|
| 6,038,223 | A * | 3/2000 | Hansson et al. | 370/329 |
| 6,181,917 | B1 | 1/2001 | Mansour et al. | |
| 6,226,279 | B1 * | 5/2001 | Hansson et al. | 370/329 |
| 6,278,706 | B1 * | 8/2001 | Gibbs et al. | 370/352 |
| 6,292,671 | B1 | 9/2001 | Mansour | |
| 6,389,005 | B1 * | 5/2002 | Cruickshank | 370/352 |
| 6,483,823 | B1 | 11/2002 | Mansour | |
| 6,490,252 | B1 * | 12/2002 | Riggan et al. | 370/237 |
| 6,654,364 | B1 | 11/2003 | Mansour | |
| 6,865,389 | B2 | 3/2005 | Lee et al. | |

(Continued)

FOREIGN PATENT DOCUMENTS
WO  WO/2005/053176  6/2005

OTHER PUBLICATIONS

COFDM as a modulation technique for wireless telecommunications, with CDMA comparison, pp. 19-24, Eric Lawrey 1997.

(Continued)

*Primary Examiner* — Dang T Ton
*Assistant Examiner* — Mandish Randhawa

(57) ABSTRACT

A wireless communication system is disclosed, including a network; and a plurality of base transceiver stations (BTS) coupled to the network, wherein at least one of the base transceiver station (BTS) is adapted to receive a request to communicate with a mobile communication unit (MU) from the network; determine whether to establish a dedicated voice channel or a dedicated packet data channel with the mobile communication unit (MU) on the basis of the request: and if the dedicated voice channel is established, receive voice information from the network and send the voice information to the mobile communication unit (MU) by way of the dedicated voice channel; or if the packet data channel is established, receive packet data from the network, encode the packet data for joint detection, and send the encoded packet data to the mobile communication unit (MU) by way of the dedicated packet data channel.

18 Claims, 6 Drawing Sheets

U.S. PATENT DOCUMENTS

| | | | |
|---|---|---|---|
| 6,978,144 B1 | 12/2005 | Choksi | |
| 7,133,672 B2 | 11/2006 | Sayeedi | |
| 7,218,624 B2 | 5/2007 | Becker et al. | |
| 7,289,551 B2* | 10/2007 | Kenney et al. | 375/147 |
| 7,366,140 B2* | 4/2008 | van Rensburg et al. | 370/334 |
| 2002/0067692 A1* | 6/2002 | Yun et al. | 370/209 |
| 2002/0196871 A1* | 12/2002 | Nishio et al. | 375/322 |
| 2003/0036408 A1 | 2/2003 | Johansson et al. | |
| 2003/0054816 A1 | 3/2003 | Krebs et al. | |
| 2003/0095499 A1* | 5/2003 | Kim et al. | 370/209 |
| 2003/0224798 A1* | 12/2003 | Willenegger et al. | 455/450 |
| 2004/0137964 A1 | 7/2004 | Lynch et al. | |
| 2004/0141479 A1* | 7/2004 | Cha et al. | 370/329 |
| 2004/0170182 A1 | 9/2004 | Higashida et al. | |
| 2006/0203758 A1* | 9/2006 | Tee et al. | 370/315 |
| 2006/0221939 A1* | 10/2006 | Rosen et al. | 370/352 |

OTHER PUBLICATIONS

Capacity Simulation of cdma 2000 1xEv Wireless Internet Access System, Peter J. Black and Mehmet I. Gurelli, QUALCOMM Incorporated.

Basic Joint Detection Methods for CDMA, pp. 1-22, Christian Schlegel.

Efficient Joint Detection Techniques for TD-CDMA in the Frequency Domain, Marius Vollmer, et al.

Joint Detection in TD-CDMA, pp. 1-4, Jul. 14, 2004.

A Wireless Packet Multiple Access Method Exploiting Joint Detection, pp. 1-16, Preeti Kota and Christian Schlegel.

Comparative Study of Joint-Detection Techniques for TD-CDMA based Mobile Radio Systems, Marius Vollmer, et al., IEEE Journal on Selected Areas in Communications (Revised).

* cited by examiner

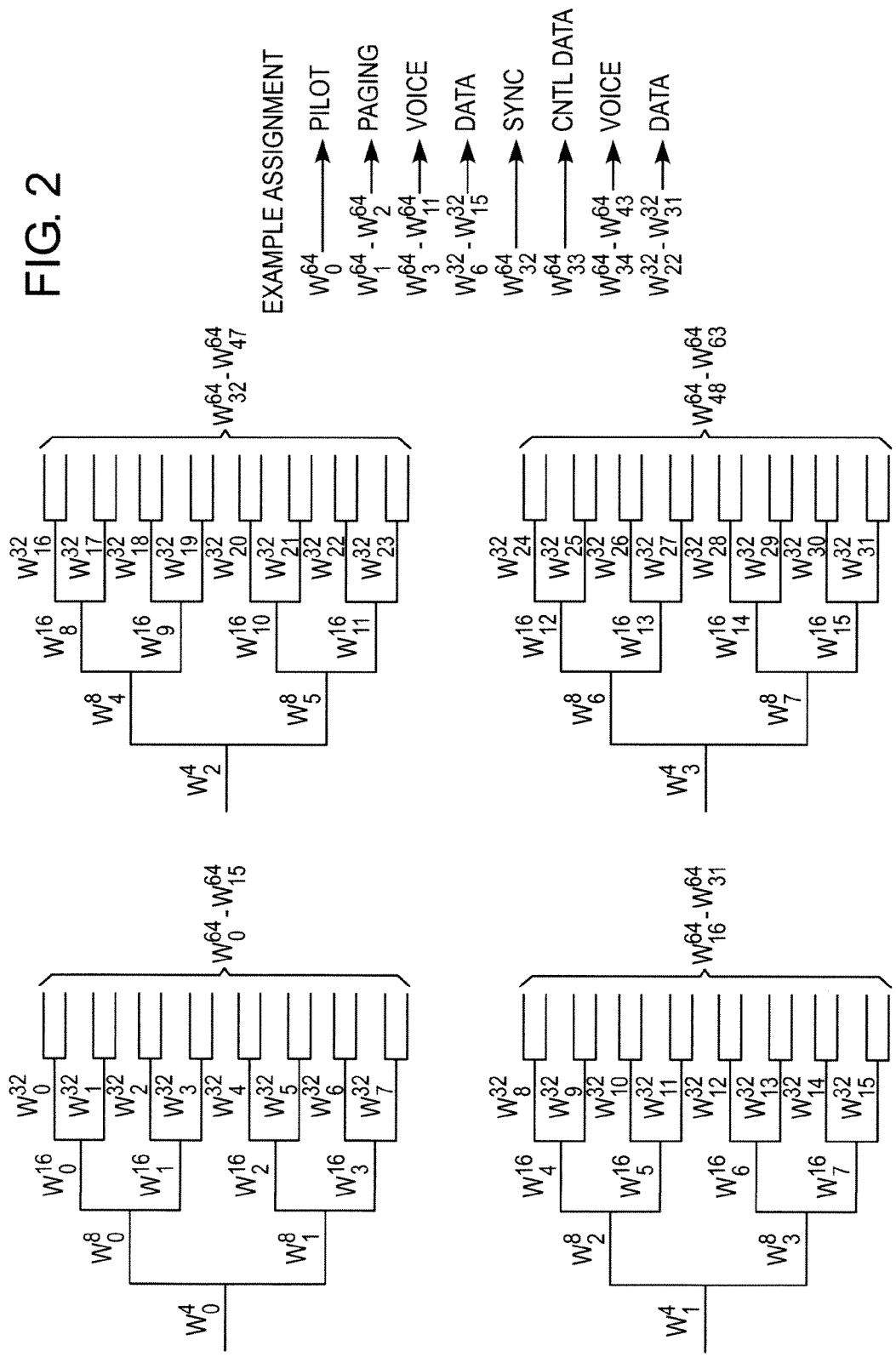

SYSTEM AND METHOD OF INCREASING THE DATA THROUGHPUT OF THE PDCH CHANNEL IN A WIRELESS COMMUNICATION SYSTEM

FIELD OF THE INVENTION

This invention relates generally to wireless communication systems, and in particular, to a system and method of increasing the data throughput of the packet data channel (PDCH) channel of a 1xEV-DV compliant system using a joint detection technique.

BACKGROUND OF THE INVENTION

Wireless communication systems have been extremely popular for more than a decade. They allow users to communicate with each other while remaining geographically mobile. These systems also allow communications to be in different modes, such as full-duplex voice, half-duplex voice, and data, as examples. An example of a wireless communication system protocol is 1xEV-DV which specifies the requirements for a system that is optimized for both data and voice communications. Although an 1xEV-DV wireless communication system serves to exemplify the invention, it shall be understood that the invention is applicable to other types of wireless communication systems.

The forward link of a 1xEV-DV wireless communication system is of particular interest herein. This is the wireless communication link for sending voice and data from a base transceiver station (BTS) to mobile communication unit (MU). According to the 1xEV-DV protocol, a compliant wireless communication system shall be backwards compatible with the IS-95 and CDMA2000 specification for the forward link. This specification provides that the forward link uses a time division (TD)/code division multiple access (CDMA) modulation scheme to send voice and data information from a base transceiver station (BTS) to mobile communication units (MUs). According to the TD/CDMA modulation scheme, time slots are used to simultaneously transmit frames of data and voice to a plurality of mobile communication units (MUs), and Walsh codes to define separate channels for communicating with the mobile communication units (MUs).

According to the IS-95 and CDMA2000 specification, a base transceiver station (BTS) uses 64 Walsh codes in the forward link to implement separate channels to communicate with mobile communication units (MUs). The maximum length of each of the Walsh codes is 64 bits. One of the Walsh code is reserved for a Pilot channel ($W_0^{64}$). Another Walsh code is reserved for a Sync channel ($w_{32}^{64}$). Up to seven of the Walsh codes may be reserved for Paging channels ($W_1^{64}$-$W_7^{64}$). And, the remaining Walsh codes are reserved for dedicated traffic channels through which voice is sent to the respective mobile communication units (MUs).

The IS-95 and CDMA2000 protocols were originally developed for wireless communication systems that provide primarily time-sensitive voice communications, such as interconnect voice communications and dispatch voice communications. However, since the inception of these protocols, there has been a substantial growth in the need for the communication of packet of data (i.e., non-time-sensitive voice communications), such as webpages, objects, emails, video and other information. In response to such need, the 1xEV-DV protocol was developed for the transmission of data at substantially higher data rates, such as 3.1 mega bits per second (Mbps). Since many of today's wireless communication systems were based on the IS-95 and CDMA2000 protocols, the 1xEV-DV protocol can be used with IS-95- and CDMA2000-based systems. Thus, the forward link specification for existing IS-95- and CDMA2000-based wireless communication systems can implement the 1xEV-DV protocol.

According to the 1xEV-DV protocol, the forward link has up to 28 Walsh codes reserved for packet data channels (PDCH) for communicating data from a base transceiver station (BTS) to a plurality of mobile communication units (MUs). Each Walsh code has a length of 32 bits. Since, as discussed above, the 1xEV-DV forward link must be compatible with the forward link specified in the IS-95 and CDMA2000 protocols, the 28 Walsh codes use the same Walsh code tree structure as that of the forward link of an IS-95 or CDMA 2000 compliant system. Accordingly, the 28 Walsh codes reserved for 1xEV-DV consume 56 out of the available 64 Walsh codes for the forward link. Since there may be at least four common channels (e.g., the Pilot, Sync, and a couple of Paging channels), that only leaves four channels for transmission of voice.

SUMMARY OF THE INVENTION

An aspect of the invention relates to a wireless communication system, comprising a network, and a plurality of base transceiver stations (BTS) coupled to the network. At least one of the base transceiver station (BTS) is adapted to receive a request to communicate with a mobile communication unit (MU) from the network; determine whether to establish a dedicated voice channel or a dedicated packet data channel with the mobile communication unit (MU) on the basis of the request: and if the dedicated voice channel is established, receive voice information from the network and send the voice information to the mobile communication unit (MU) by way of the dedicated voice channel; or if the dedicated packet data channel is established, receive packet data from the network, encode the packet data for joint detection, and send the encoded packet data to the mobile communication unit (MU) by way of the dedicated packet data channel.

Another aspect of the invention relates to a base transceiver station (BTS), comprising a network interface; an antenna; a radio frequency (RF) interface; and a processor. The processor is adapted to receive a request to communicate with a mobile communication unit (MU) by way of the network interface; determine whether to establish a dedicated voice channel or a dedicated packet data channel with the mobile communication unit (MU) on the basis of the request: and if the dedicated voice channel is established, receive voice information from the network and send the voice information to the mobile communication unit (MU) via the dedicated voice channel and by way of the RF interface and the antenna; or if the dedicated packet data channel is established, receive packet data from the network, encode the packet data for joint detection, and send the encoded packet data to the mobile communication unit (MU) via the dedicated packet channel and by way of the RF interface and the antenna.

Yet another aspect of the invention relates to a mobile communication unit (MU), comprising an antenna, a radio frequency (RF) interface, and a processor. The processor is adapted to receive an assignment of a Walsh code from a base transceiver station (BTS) by way of the antenna and the RF interface; determine whether the Walsh code is for a dedicated voice channel or a dedicated packet data; and if the Walsh code is for the dedicated voice channel, receive voice information via the dedicated voice channel and by way of the antenna and the RF interface, and send the voice channel to a first output device; or if the Walsh code is for the packet data channel, receive packet data via the packet data channel and by way of the antenna and the RF interface, apply joint detection to the received packet data, and send the packet data to a second output device.

Other aspects, features, and techniques of the invention will be apparent to one skilled in the relevant art in view of the following detailed description of the invention.

BRIEF DESCRIPTION OF THE DRAWINGS

FIG. 2 illustrates a diagram of an exemplary Walsh code assignment in accordance with another embodiment of the invention;

DETAILED DESCRIPTION OF THE EXEMPLARY EMBODIMENTS

Figure 1:
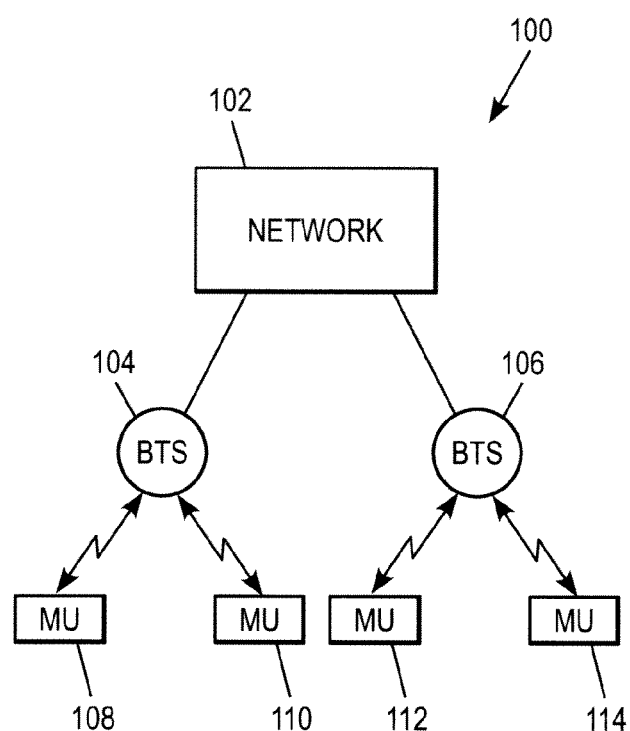
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. The wireless communication system 100 comprises a network 102, and a plurality of base transceiver stations (BTS) 104 and 106 coupled to the network 102. The wireless communication system 100 provides wireless communication services to a plurality of mobile communication units (MUs), two of which are shown as mobile communication units (MUs) 108 and 110 assigned to communicate with base transceiver station (BTS) 104, and two of which are shown as mobile communication units (MUs) 112 and 114 assigned to communicate with base transceiver station (BTS) 106.

The wireless communication system 100 provides time-sensitive voice communication services, such as interconnect calling (full duplex) and/or dispatch calling (half duplex). The wireless communication system 100 also provides packet data communication services (i.e., non-time-sensitive voice communications), such as internet and/or intranet resources (e.g., webpages and objects), email, video and others.

In summary, the wireless communication system 100 is characterized in that joint detection is applied to the packet data channels (PDCH) to increase the data throughput of these channels. As a result of the increase data throughput, the number of packet data channels (PDCH) needed for the wireless communication system 100 may be less. This allows more channels to be used for voice. Thus, the wireless communication system may provide a more balanced allocation of packet data channels (PDCH) to voice channels. The following example illustrates a possible channel assignment for the forward link of the wireless communication system 100.

FIG. 2 illustrates a diagram of an exemplary Walsh code assignment in accordance with another embodiment of the invention. The Walsh code assignment may be used for the forward link of the wireless communication system 100. The Walsh code assignment may include five (5) Walsh codes reserved for common channels. For example, Walsh code $W_0^{64}$ may be reserved for the Pilot channel, Walsh code $W_{32}^{64}$ may be reserved for the Sync channel, Walsh codes $W_1^{64}$-$W_2^{64}$ may be reserved for Paging channels, and Walsh code $W_{33}^{64}$ may be reserved for a control channel for the packet data channels (PDCHs). The Walsh code assignment may include 19 Walsh codes reserved for voice channels. For example, Walsh codes $W_3^{64}$-$W_{11}^{64}$ and $W_{34}^{64}$-$W_{43}^{64}$ may be reserved for voice channels. Further, the Walsh code assignment may include 20 Walsh codes reserved for packet data channels (PDCH). For example, Walsh codes $W_6^{32}$-$W_{15}^{32}$ and $W_{22}^{32}$-$W_{31}^{32}$ may be reserved for packet data channels (PDCHs).

Thus, by implementing joint detection in the packet data channels (PDCH), a higher data throughput may be achieved for each of these channels. Again, this may reduce the number of packet data channels (PDCHs) required for the wireless communication system 100. The less number of packet data channels (PDCH) needed translates to more channels available for voice communications. Thus, the wireless communication system 100 may be configured to provide a more balanced allocation of Walsh codes between packet data channels (PDCHs) and voice channels. For instance, according to the exemplary Walsh code assignment, there are 19 Walsh codes reserved for voice channels and 20 Walsh codes reserved for packet data channels (PDCHs).

There are many algorithms developed for joint detection. In general, a known set of bits is added to the data for each transmission burst. The receiving mobile communication unit (MU) has knowledge of the known set of bits. Using the known set of bits, the mobile communication unit (MU) is able to characterize its RF environment. In particular, the mobile communication unit (MU) generates a matrix of coefficients using the known bits for all Walsh codes. Then, the generated matrix of coefficient is used to rectify impairments that have occurred to the information bits. Joint detection is particularly suitable for 1xEV-DV systems because it only uses 32-length Walsh codes. Therefore, the overhead incurred in processing the added known set of bits is relatively minor.

Figure 3A:
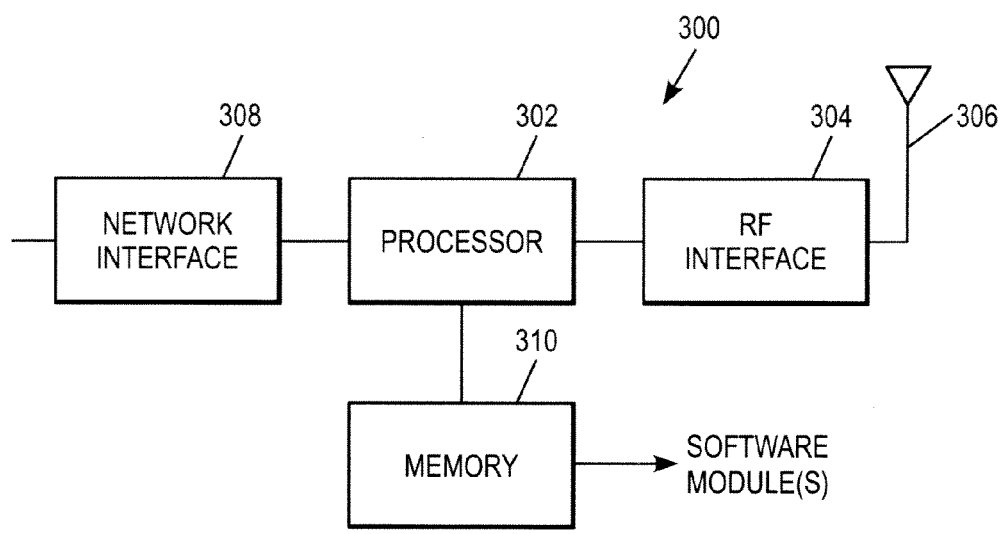
FIG. 3A illustrates a block diagram of an exemplary base transceiver station (BTS) in accordance with another embodiment of the invention.

FIG. 3A illustrates a block diagram of an exemplary base transceiver station (BTS) 300 in accordance with another embodiment of the invention. The base transceiver station (BTS) 300 may be an exemplary detail version of the base transceiver stations (BTS) 104 and/or 106 of wireless communication system 100. The base station 300 comprises a processor 302, an RF interface 304, a network interface 306, and a memory 308.

The processor 302 performs the various operations of the base transceiver station (BTS) 300, one of which is discussed with reference to FIG. 3B. The network interface 306 provides the base transceiver station (BTS) 300 an interface to the network 102 to receive communications from and send communications to network devices. The RF interface 304 including the antenna 306 provide the base transceiver station (BTS) 300 an interface to the wireless medium to receive communications from and send communications to mobile communication units (MUs). The memory 308, serving generally as a computer readable medium, stores one or more software modules that control the processor 302 in performing its various operations. An exemplary operation implemented by the base transceiver station (BTS) 300 is discussed as follows.

Figure 3B:
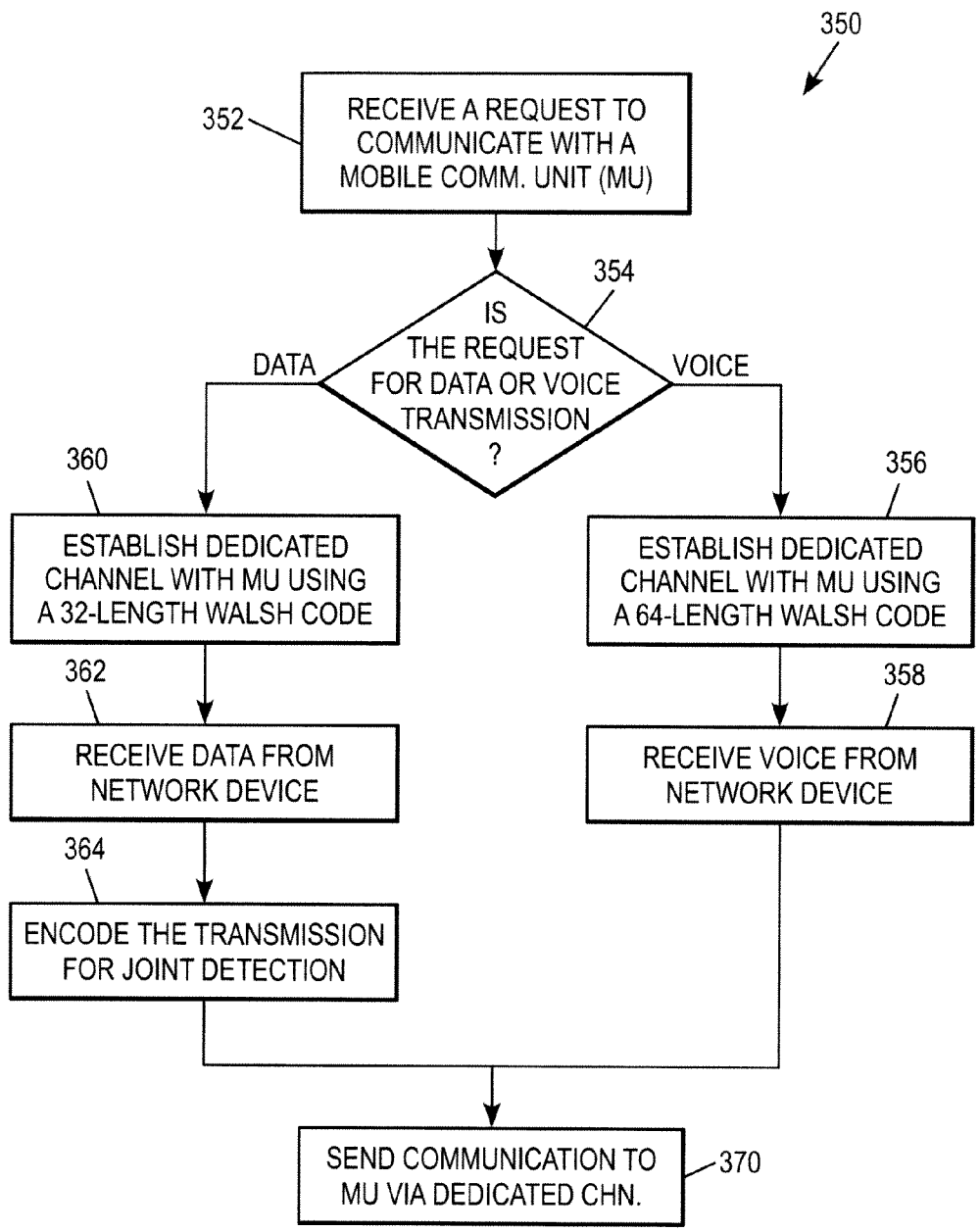
FIG. 3B illustrates a flow diagram of a method implemented by the base transceiver station (BTS) in accordance with another embodiment of the invention.

FIG. 3B illustrates a flow diagram of an exemplary method 350 implemented by the base transceiver station (BTS) 300 in accordance with another embodiment of the invention.

According to the method 350, the processor 302 receives a request to communicate with a mobile communication unit (MU) from a network device by way of the network interface 308 (block 352). The processor 302 then determines whether the communication request is for the transmission of packet data or voice to the mobile communication unit (MU) (block 354). If the communication request is for transmitting voice to the mobile communication unit (MU), then the processor 302 establishes a voice channel with the mobile communication unit (MU) using, for example, one of the 64-length Walsh code (block 356). Then the processor 302 receives the voice information from the network device by way of the network interface 308 (block 358). The processor 302 then sends the voice information to the mobile communication unit (MU) using the dedicated voice channel and by way of the RF interface 304 and antenna 306 (block 370).

If, on the other hand, the processor 302 in block 354 determines that the request to communicate with the mobile communication unit (MU) is for the transmission of packet data, then the processor 302 establishes a packet data channel (PDCH) with the mobile communication unit (MU) using, for example, one of the 32-length Walsh code (block 360). Then, the processor 302 receives the data from the network device by way of the network interface 308 (block 362). The processor 302 then encodes the transmission for joint detection by, for example, adding the known set of bits to the data as discussed above (block 364). The processor 302 then sends the encoded data to the mobile communication unit (MU) using the dedicated packet data channel (PDCH) and by way of the RF interface 304 and antenna 306 (block 370).

Figure 4A:
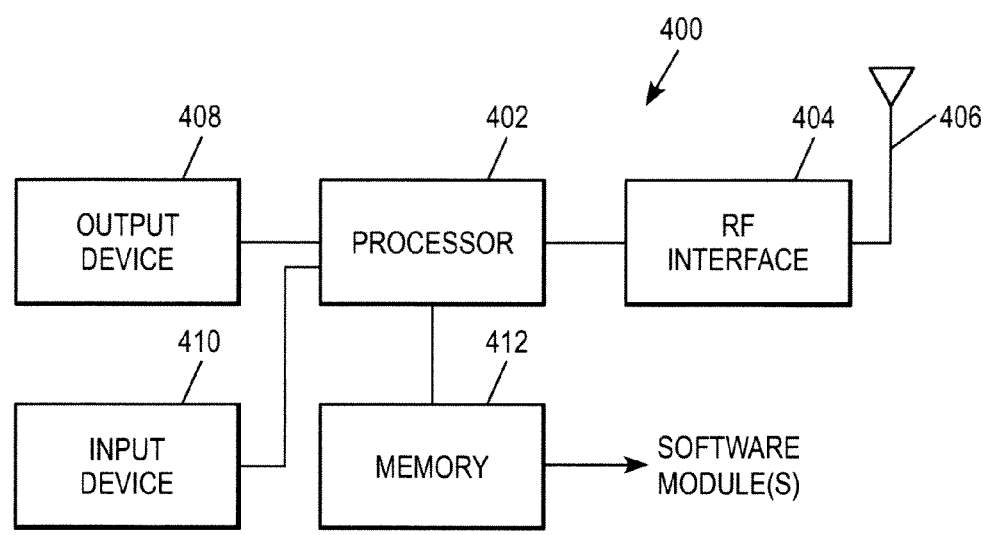
FIG. 4A illustrates a block diagram of an exemplary mobile communication unit (MU) in accordance with another embodiment of the invention.

FIG. 4A illustrates a block diagram of an exemplary mobile communication unit (MU) 400 in accordance with another embodiment of the invention. The mobile communication unit (MU) 400 may be an exemplary detail version any of the mobile communication units (MU) 108, 110, 112, and 114 of wireless communication system 100. The mobile communication unit (MU) 400 comprises a processor 402, an RF interface 404, an antenna 406, an output device 408, an input device 410, and a memory 412.

The processor 402 performs the various operations of the mobile communication unit (MU) 400, one of which is discussed with reference to FIG. 4B. The RF interface 404 including the antenna 406 provide the mobile communication unit (MU) 400 an interface to the wireless medium to receive communications from and send communications to base transceiver stations (BTS). The output device 408 (e.g., a display, speaker etc.) allows the processor 402 to send information (voice and packet data) to a user. The input device 410 (e.g., a keyboard, pointing device, microphone, etc.) allows a user to provide information to the processor 402. It shall be understood that the output device 408 and input device 410 may be an integrated unit, such as a touch-sensitive screen. The memory 412, serving generally as a computer readable medium, stores one or more software module(s) that control the processor 402 in performing its various operations. An exemplary operation implemented by the mobile communication unit (MU) 400 is discussed as follows.

Figure 4B:
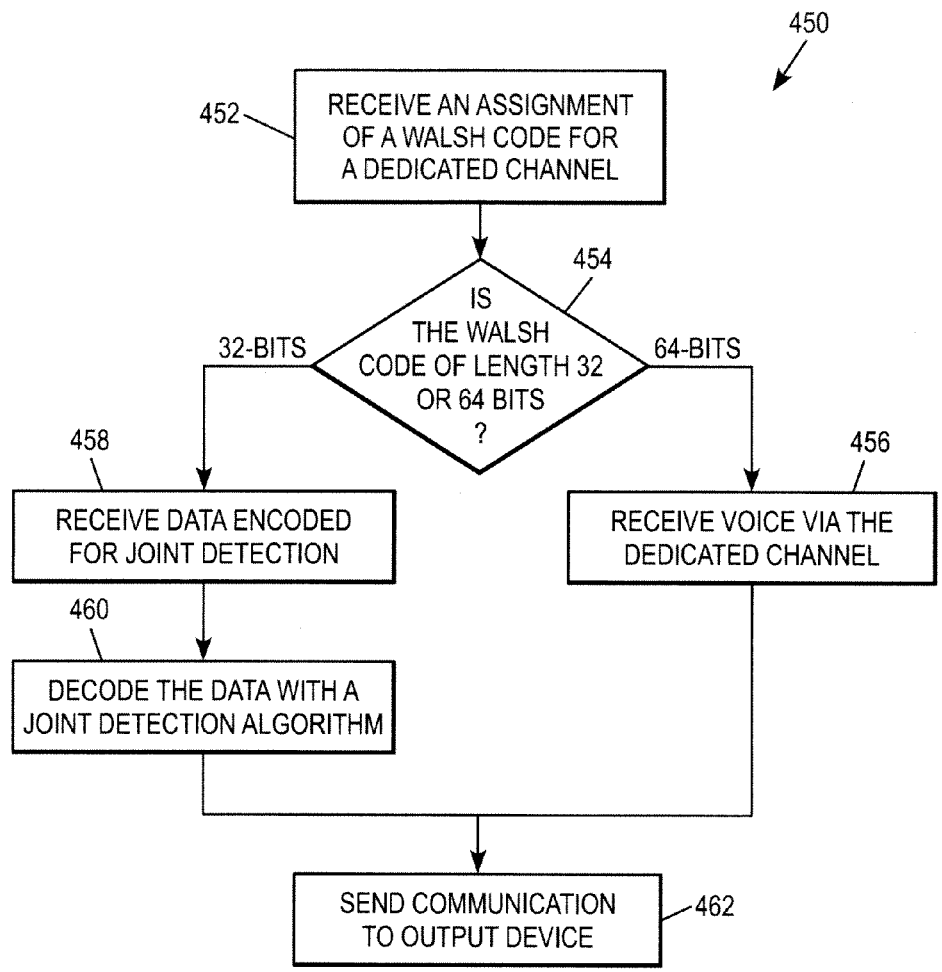
FIG. 4B illustrates a flow diagram of a method implemented by the mobile communication unit (MU) in accordance with another embodiment of the invention.

FIG. 4B illustrates a flow diagram of a method 450 implemented by the mobile communication unit (MU) 400 in accordance with another embodiment of the invention. According to the method 450, the processor receives an assignment of a Walsh code for a dedicated channel from a base transceiver station (BTS) by way of the antenna 406 and RF interface 404 (block 452). The processor 402 then determines whether the Walsh code is for the transmission of packet data or voice (block 454). The processor 402 may make this determination by examining the length of the assigned Walsh code (block 454). If the processor 402 determines that the assigned Walsh code is for a dedicated voice channel, then the processor 402 will subsequently receive voice information using the dedicated voice channel and by way of the antenna 406 and RF interface 404 (block 456). Then, the processor 402 sends the voice information to the output device 410 (e.g., a speaker) (block 462).

If, on the other hand, the processor 402 in block 454 determines that the assigned Walsh code is for a dedicated data packet channel (PDCH), then the processor 402 subsequently receives the packet data encoded for joint detection using the dedicated data packet channel (PDCH) and by way of the antenna 406 and RF interface 404 (block 458). The processor 402 then applies joint detection to the received packet data (block 460). Then, the processor 402 sends the packet data to the output device 410 (e.g., a display) (block 462).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A wireless communication system, comprising:
a network;
a plurality of base transceiver stations (BTS) coupled to said network, wherein at least one of said base transceiver station (BTS) includes a processor and a memory that stores one or more software modules that control the processor to:
receive a request to communicate with a mobile communication unit (MU) from said network;
determine whether to establish a dedicated voice channel or a dedicated packet data channel with said mobile communication unit on the basis of said request
wherein when said dedicated voice channel is established, the one or more software modules control the processor to
receive voice information from said network, and
send said voice information to said mobile communication unit (MU) by way of said dedicated voice channel, wherein the sent voice information is not encoded for joint detection, and
wherein when said dedicated packet data channel is established, the one or more software modules control the processor to
receive packet data from said network, encode said packet data for joint detection, and
send said encoded packet data to said mobile communication unit (MU) by way of said dedicated packet data channel.

2. The wireless communication system of claim 1, wherein said dedicated voice channel uses a first Walsh code having a first length, and said dedicated packet data channel uses a second Walsh code having a second length different than said first length of said first Walsh code.

3. The wireless communication system of claim 2, wherein said first length of said first Walsh code is 64 bits, and said second length of said second Walsh code is 32 bits.

4. The wireless communication system of claim 2, wherein said first length of said first Walsh code is 64 bits.

5. The wireless communication system of claim 2, wherein said second length of said second Walsh code is 32 bits.

6. A base transceiver station (BTS), comprising:
a network interface;
an antenna;
a radio frequency (RF) interface;
a processor; and
a memory that stores one or more software modules that control the processor to
  receive a request to communicate with a mobile communication unit (MU) by way of said network interface;
  determine whether to establish a dedicated voice channel or a dedicated packet data channel with said mobile communication unit (MU) on the basis of said request
  wherein when said dedicated voice channel is established, the one or more software modules control the processor to
    receive voice information from said network, and
    send said voice information to said mobile communication unit (MU) using said dedicated voice channel and by way of said RF interface and said antenna, wherein the sent voice information is not encoded for joint detection, and
  wherein when said dedicated packet data channel is established, the one or more software modules control the processor to
    receive packet data from said network, encode said packet data for joint detection, and
    send said encoded packet data to said mobile communication unit (MU) using said dedicated packet data channel and by way of said RF interface and said antenna.

7. The base transceiver station (BTS) of claim 6, wherein said memory stores one or more software modules that control the processor to assign a first Walsh code for said dedicated voice channel.

8. The base transceiver station (BTS) of claim 7, wherein said first Walsh code has a length of 64 bits.

9. The base transceiver station (BTS) of claim 8, wherein said memory stores one or more software modules that control the processor to assign a second Walsh code for said dedicated packet data channel.

10. The base transceiver station (BTS) of claim 9, wherein said second Walsh code has a length of 32 bits.

11. The base transceiver station (BTS) of claim 6, wherein said memory stores one or more software modules that control the processor to assign a first Walsh code for said dedicated packet data channel.

12. The base transceiver station (BTS) of claim 11, wherein said first Walsh code has a length of 32 bits.

13. A mobile communication unit (MU), comprising:
an antenna;
a radio frequency (RF) interface; and
a processor; and
a memory that stores one or more software modules that control the processor to
  receive an assignment of a Walsh code from a base transceiver station (BTS) by way of said antenna and said RF interface;
  determine whether said Walsh code is for a dedicated voice channel or a dedicated packet data channel,
  wherein when said Walsh code is for said dedicated voice channel, the one or more software modules control the processor to
    receive voice information via said dedicated voice channel and by way of said antenna and said RF interface, and
    send said voice information to a first output device, wherein the sent voice information is not subject to joint detection, and
  wherein when said Walsh code is for said packet data channel, the one or more software modules control the processor to
    receive packet data via said packet data channel and by way of said antenna and said RF interface,
    apply joint detection to said received packet data, and
    send said packet data to a second output device.

14. The mobile communication unit (MU) of claim 13, wherein said memory stores one or more software modules that control the processor to determine whether said Walsh code is for said dedicated voice channel or said dedicated packet data channel by examining a length of said Walsh code.

15. The mobile communication unit (MU) of claim 14, wherein said memory stores one or more software modules that control the processor to determine whether said Walsh code is for a dedicated voice channel if said length of said Walsh code is 64 bits.

16. The mobile communication unit (MU) of claim 14, wherein said memory stores one or more software modules that control the processor to determine whether said Walsh code is for a dedicated data packet channel if said length of said Walsh code is less than 64 bits.

17. The mobile communication unit (MU) of claim 13, wherein said first output device comprises a speaker.

18. The mobile communication unit (MU) of claim 13, wherein said second output device comprises a display.

* * * * *